(12) United States Patent
Wu

(10) Patent No.: US 11,924,807 B2
(45) Date of Patent: Mar. 5, 2024

(54) PAGING NOTIFICATION MANAGEMENT IN A WIRELESS NETWORK

(71) Applicant: Charter Communications Operating, LLC, St. Louis, MO (US)

(72) Inventor: Deh-Min Richard Wu, Centennial, CO (US)

(73) Assignee: Charter Communications Operating, LLC, St. Louis, MO (US)

( * ) Notice: Subject to any disclaimer, the term of this patent is extended or adjusted under 35 U.S.C. 154(b) by 182 days.

(21) Appl. No.: 17/409,471

(22) Filed: Aug. 23, 2021

(65) Prior Publication Data
US 2023/0063336 A1  Mar. 2, 2023

(51) Int. Cl.
*H04W 68/02* (2009.01)
(52) U.S. Cl.
CPC .................................. *H04W 68/02* (2013.01)
(58) Field of Classification Search
CPC ..................................................... H04W 68/02
USPC ......................................................... 455/458
See application file for complete search history.

(56) References Cited

U.S. PATENT DOCUMENTS

| 2010/0067450 | A1* | 3/2010 | Balachandran | ....... H04L 5/0082 370/329 |
| 2019/0394711 | A1 | 12/2019 | Kim | |
| 2020/0015196 | A1* | 1/2020 | Sivavakeesar | ........ H04W 88/08 |
| 2022/0150768 | A1* | 5/2022 | Rugeland | ............ H04W 68/005 |

OTHER PUBLICATIONS

Mayer, Georg, "RESTful APIs for the 5G Service Based Architecture", Received Mar. 31, 2018; Accepted May 3, 2018, pp. 101-116, Journal of ICT, vol. 6-1&2, River Publishers.

* cited by examiner

*Primary Examiner* — Joel Ajayi
(74) *Attorney, Agent, or Firm* — Armis IP Law, LLC

(57) ABSTRACT

A wireless network environment includes user equipment. A communication management resource in the user equipment establishes a wireless communication link between the user equipment and a first wireless station. The first wireless station provides the user equipment access to a remote network. Based on operating conditions of the user equipment, the communication management resource initiates execution of a paging notification retrieval function on the user equipment to retrieve paging notifications. Via the executed function (such as an application executed on the user equipment), and one or more request messages for paging notifications, the communication management resource communicates with a remote entity to retrieve the paging notifications.

33 Claims, 10 Drawing Sheets

PAGING NOTIFICATION MANAGEMENT IN A WIRELESS NETWORK

BACKGROUND

Conventional wireless networks support different wireless communication protocols. For example, so-called Wi-Fi™ communication protocols are typically simple protocols supporting less reliable wireless connectivity. More complex cellular wireless communication protocols such as 5G (such as defined by 3GPP) support more reliable wireless connectivity. In certain instances, there is a need to switchover from one wireless communication protocol to another.

The 5G wireless protocol supports so-called paging notifications. Paging messages are sent by an MME (Mobile Management Entity) to all base stations in a Tracking Area; the base stations in the Tracking Area transmit the same paging message.

In general, paging messages are communicated via scheduled PDSCH transmissions. A respective mobile communication device is notified of a particular one or more timeslots in respective paging frames in which to monitor for paging notifications. Typically, the mobile communication device operates in a low power mode (sleep mode). The device wakes up at specific time instances of time, such as once every 100 ms or even less often, to monitor for paging messages. Paging messages are indicated by a specific PI-RNTI carried within the DCI. Once detecting such a DCI, the device demodulates and decodes the corresponding PDSCH to extract the paging message(s).

BRIEF DESCRIPTION OF EMBODIMENTS

FIG. 1 is an example diagram of a wireless network environment providing wireless paging notifications (and paging occasions) via different wireless networks according to conventional techniques. As shown, MME1 (Mobile Management Entity #1) provides paging notifications to the mobile communication device while the mobile communication device 121 is within the region of wireless coverage (small cell) provided by the wireless base station 131 in the MSO network 190-1. MME2 (Mobile Management Entity #2) provides paging notifications to the mobile communication device while the mobile communication device 121 is within the region of wireless coverage (such as a Macrocell) provided by the wireless base station 132 in the MSO network 190-2.

FIG. 2 is an example diagram illustrating communications supporting conveyance of paging notifications (messages) amongst user equipment, a wireless station (such as gNB), and a Mobile Management Entity according to conventional techniques.

In contrast to conventional techniques, embodiments herein provide improved use of wireless resources (such as available wireless spectrum) to support wireless communications in a network environment.

More specifically, user equipment (such as a mobile communication device) implements a communication management function (resource such as implemented via hardware and/or software) to support retrieval of communication management messages such as paging notifications. The communication management resource initially establishes a wireless communication link between user equipment and a first wireless station. The first wireless station provides the user equipment access to a remote network. To retrieve paging notifications during certain conditions, the communication management resource initiates execution of a communication management function (such as paging notification retrieval application). Via the executed communication management function, the communication management resource communicates with a remote entity to retrieve the paging notifications associated with the user equipment.

The communication management function (such as paging notification retrieval application) can be executed based on current operating conditions. For example, further embodiments herein include, via the communication management resource, monitoring a quality of the wireless communication link; and initiating execution of the communication management function (such as paging notification retrieval application) based on the quality of the wireless communication link. In one embodiment, the communication management resource initiates execution of the communication management function (such as paging notification retrieval application) in response to detecting that a quality of the wireless communication link falls below a threshold level such as during a handoff of a respective wireless communication link.

In further example embodiments, the communication management resource initiates execution of the communication management function in response to detecting mobility (i.e., movement) of the user equipment in a network environment.

Still further example embodiments herein include, via the communication management resource and communication management paging notification retrieval function, communicating a request message from the user equipment over the wireless communication link to the remote entity. The request message requests retrieval of the paging notifications.

In still further example embodiments, the communication management function receives multiple instances of the paging notification over different network communication layers. For example, in one embodiment, the communication management function: i) receives first instances of the paging notifications in time slots of a paging channel assigned to the user equipment from a second wireless station; and ii) via wireless communications to and through the first wireless station, retrieves second instances of the paging notifications via the executed communication management function.

In one embodiment, the wireless communication link between the user equipment and the first wireless station is a secured connection between the user equipment and the first wireless station.

As previously discussed, the communication management resource can be configured to execute the communication management function (such as paging notification retrieval application) depending on operating conditions of the user equipment. In one embodiment, the communication management resource executes the communication management function such as the paging notification retrieval application during a handoff of the user equipment from the first wireless station to a second wireless station. In one embodiment, the execution of the paging notification retrieval application facilitates a more reliable handoff (such as soft handoff) of the user equipment from the first wireless station to the second wireless station. The reliable handoff as discussed herein (via implementation of the paging notification retrieval application) prevents the user equipment from experiencing a hard handoff and loss of service, in which there is a duration of time when the user equipment is not connected to either the first wireless station or the second wireless station.

In further example embodiments, the first wireless station implements a first wireless communication protocol in a first network environment; the second wireless station implements a second wireless communication protocol in a second network environment. Execution of the paging notification retrieval application as discussed herein facilitates a handoff of the user equipment from the first wireless network supporting the first wireless communication protocol to the second wireless network supporting the second wireless communication protocol.

In still further example embodiments, the paging notification retrieval application is configured to communicate with the remote entity via wireless transmitting of communications such as one or more messages over the wireless communication link to a network address assigned to the remote entity. In response to set up and requesting retrieval of the paging notifications, such as associated with a handoff of the user equipment from the first wireless station (in a first wireless network) to a second wireless station (in a second wireless network), the remote entity communicates the paging notifications associated with the user equipment through the first wireless station and over wireless communication link to the user equipment.

Thus, the paging notification retrieval application as discussed herein can be configured to facilitate a handoff of the user equipment from a first wireless station to a second wireless station. Additionally, or alternatively, the paging notification retrieval application as discussed herein supports retrieval of paging notifications during non-handoff conditions. In one embodiment, the second wireless station communicates an instance of the paging notifications to the user equipment.

Embodiments herein are useful over conventional techniques. For example, embodiments herein include a novel method of retrieving paging notifications associated with user equipment operated in a wireless network environment.

Note that any of the resources as discussed herein can include one or more computerized devices, mobile communication devices, sensors, servers, base stations, wireless communication equipment, communication management systems, controllers, workstations, user equipment, handheld or laptop computers, or the like to carry out and/or support any or all of the method operations disclosed herein. In other words, one or more computerized devices or processors can be programmed and/or configured to operate as explained herein to carry out the different embodiments as described herein.

Yet other embodiments herein include software programs to perform the steps and operations summarized above and disclosed in detail below. One such embodiment comprises a computer program product including a non-transitory computer-readable storage medium (i.e., any computer readable hardware storage medium) on which software instructions are encoded for subsequent execution. The instructions, when executed in a computerized device (hardware) having a processor, program and/or cause the processor (hardware) to perform the operations disclosed herein. Such arrangements are typically provided as software, code, instructions, and/or other data (e.g., data structures) arranged or encoded on a non-transitory computer readable storage medium such as an optical medium (e.g., CD-ROM), floppy disk, hard disk, memory stick, memory device, etc., or other medium such as firmware in one or more ROM, RAM, PROM, etc., or as an Application Specific Integrated Circuit (ASIC), etc. The software or firmware or other such configurations can be installed onto a computerized device to cause the computerized device to perform the techniques explained herein.

Accordingly, embodiments herein are directed to a method, system, computer program product, etc., that supports operations as discussed herein.

One embodiment includes a computer readable storage medium and/or system having instructions stored thereon. The instructions, when executed by the computer processor hardware, cause the computer processor hardware (such as one or more co-located or disparately processor devices or hardware) to: establish a wireless communication link between user equipment and a first wireless station, the first wireless station providing the user equipment access to a remote network; initiate execution of a communication management function on the user equipment; and via the executed communication management function, communicate with a remote entity to retrieve communication management messages associated with accessing the remote network.

The ordering of the steps above has been added for clarity sake. Note that any of the processing steps as discussed herein can be performed in any suitable order.

Other embodiments of the present disclosure include software programs and/or respective hardware to perform any of the method embodiment steps and operations summarized above and disclosed in detail below.

It is to be understood that the system, method, apparatus, instructions on computer readable storage media, etc., as discussed herein also can be embodied strictly as a software program, firmware, as a hybrid of software, hardware and/or firmware, or as hardware alone such as within a processor (hardware or software), or within an operating system or a within a software application.

As discussed herein, techniques herein are well suited for use in the field of providing dynamic data flow prioritization that varies depending on current network conditions. However, it should be noted that embodiments herein are not limited to use in such applications and that the techniques discussed herein are well suited for other applications as well.

Additionally, note that although each of the different features, techniques, configurations, etc., herein may be discussed in different places of this disclosure, it is intended, where suitable, that each of the concepts can optionally be executed independently of each other or in combination with each other. Accordingly, the one or more present inventions as described herein can be embodied and viewed in many different ways.

Also, note that this preliminary discussion of embodiments herein (BRIEF DESCRIPTION OF EMBODIMENTS) purposefully does not specify every embodiment and/or incrementally novel aspect of the present disclosure or claimed invention(s). Instead, this brief description only presents general embodiments and corresponding points of novelty over conventional techniques. For additional details and/or possible perspectives (permutations) of the invention(s), the reader is directed to the Detailed Description section (which is a summary of embodiments) and corresponding figures of the present disclosure as further discussed below.

Figure 1:
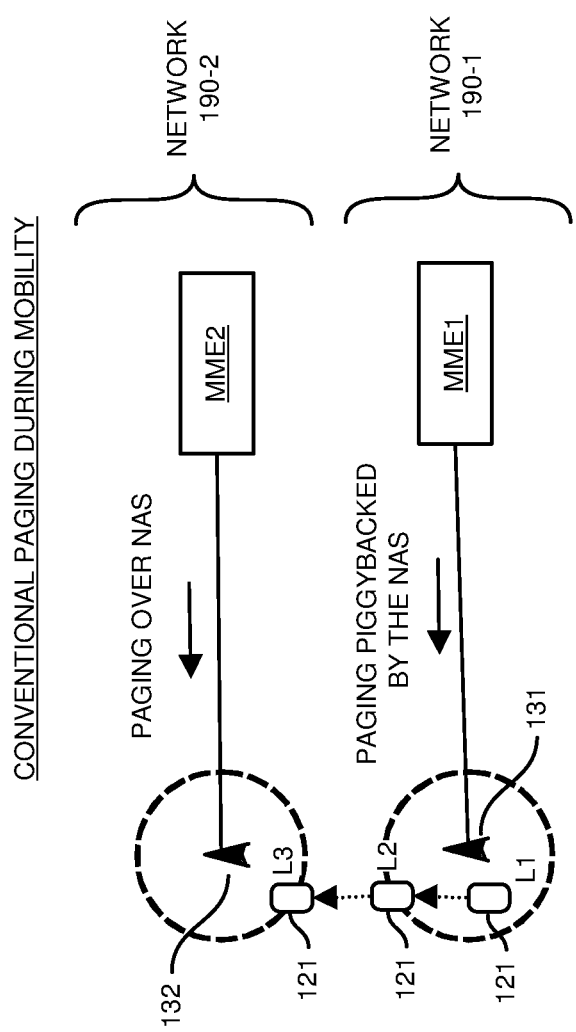
FIG. 1 is an example diagram of a wireless network environment providing wireless paging notifications (and paging occasions) according to conventional techniques.
Figure 2:
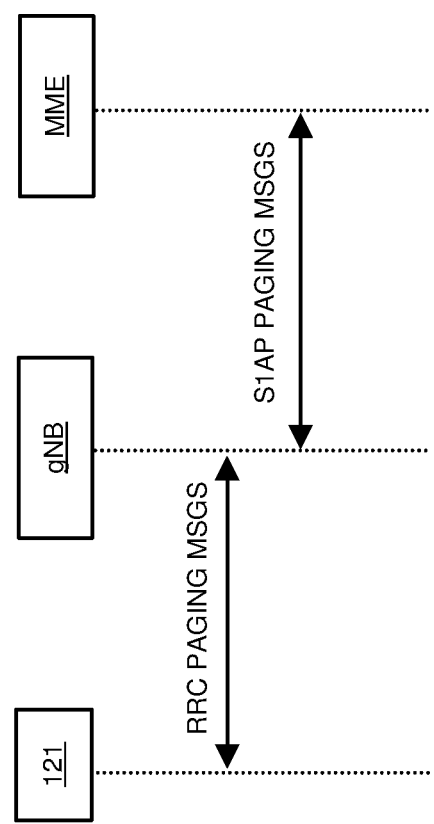
FIG. 2 is an example diagram illustrating communications supporting conveyance of paging notifications according to conventional techniques.

The foregoing and other objects, features, and advantages of the invention will be apparent from the following more particular description of preferred embodiments herein, as illustrated in the accompanying drawings in which like reference characters refer to the same parts throughout the different views. The drawings are not necessarily to scale, with emphasis instead being placed upon illustrating the embodiments, principles, concepts, etc.

DESCRIPTION OF EMBODIMENTS

According to one configuration, a wireless network environment includes user equipment (a.k.a., a mobile communication device). A communication management resource in the user equipment establishes a wireless communication link between the user equipment and a first wireless station. The first wireless station provides the user equipment access to a remote network. Based on operating conditions of the user equipment, the communication management resource initiates execution of a paging notification function (such as application) on the user equipment to retrieve paging notifications. Via the executed paging notification retrieval function, and communication of one or more request messages for paging notifications, the communication management resource communicates with a remote entity to retrieve the paging notifications pertinent to the user equipment.

In one embodiment, the paging notification functionality as discussed herein supports unconventional retrieval of paging notifications. For example, typical wireless communication protocols support distribution of paging notifications via dedicated paging notification resources. A communication device is notified to monitor specific time slots (paging occasions) of a signal communicated from a wireless station to the user equipment. In contrast to conventional techniques, when paging notifications are needed by a communication device, embodiments herein include implementing a paging notification function in the communication device to proactively communicate a request to a paging notification server that responds with paging notification communications transmitted to the user equipment. The paging notifications can be associated with a primary wireless network to which the user equipment is wirelessly connected and/or a secondary wireless network to which the user equipment is attempting to perform a respective handoff.

Main Embodiments

Spectrums mobile network achieves the best company revenue to offload as much as possible network traffic from 3GPP to Spectrums networks (non-3GPP).

Fixed network solution in SDN (Software Defined Networks) utilizes the micro-service architecture. 3GPP network solution has virtualization concept but no similar architecture as SDN and SDR (Software Defined Radio).

O-RAN and 6G may introduce a standardization to utilize micro-service architecture similarly as SDN. Micro-service and API implementation is cost effective compared with traditional ASN.1. No FMC (Fixed Mobile Convergence) procedure specified.

Advantage: Save cellular phone signaling and battery (zero costs in Spectrum fixed networks)

Features of Embodiments Herein

Signaling and management information such as configuration/measurement can be exchanged via micro-services APIs and remove the dependency on a cellular network protocol stacks and connectivity.

Cellular phone (user equipment, mobile communication device, etc.) obtains and publishes data through low layer protocols such as RRC and the standards slow and no progress limits a feasibility of an individual advanced technology. Changing to micro-services allows a mini functional building block.

Unique Embodiments Herein Over Conventional Techniques

In contrast to conventional techniques, embodiments herein include utilizing a network to overtake another network's signaling traffic. For example, embodiments herein include utilizing a fixed network (such as Spectrums Networks with Cable, Fiber, Wi-Fi™) to transport the paging notification information. In one embodiment, a respective mobile communication device (user equipment) has already successfully established a wireless network connection (Wireless LAN and landline) and is attempting to move to another (outside) network such as via a handoff. Certain embodiments herein include utilizing SDN and RESTful (Representational State Transfer) API (Application Programming Interface). In one embodiment, this is a virtualization method. New models can be implemented for different applications.

Further embodiments herein include converting each signaling procedure to many small pieces of RESTful operations based on a signaling data model. 5G RESTful API applies to service and network management. IETF defines the RESTful for Internet but no data model for cellular. In one embodiment, the paging notification application is applied inside a RAN such as UE and CU-cloud as well as UE and Core.

| Paging Parameters in SIB2 |
|---|
| BCCH-DL-SCH-Message ::= SEQUENCE<br>  +-message ::= CHOICE [c1]<br>    +-c1 ::= CHOICE [systemInformation]<br>      +-systemInformation ::= SEQUENCE<br>        +-criticalExtensions ::= CHOICE [systemInformation-r8]<br>          +-systemInformation-r8 ::= SEQUENCE [0]<br>            +-sib-TypeAndInfo ::= SEQUENCE OF SIZE(1..maxSIB[32]) [1]<br>            | +- ::= CHOICE [sib2]<br>            | +-sib2 ::= SEQUENCE [00]<br>            ......<br>            | | +-pcch-Config ::= SEQUENCE<br>            | || +-defaultPagingCycle ::= ENUMERATED [rf128]<br>            | || +-nB ::= ENUMERATED [oneT] |

According to conventional techniques, protocol stack supporting SIB2 transmission and receipt are not provided between nodes in non-3GPP nodes/user devices. For example, Wi-Fi™ does not support paging notifications via paging occasions in a dedicated wireless paging channel. Transport signaling is always through a 3GPP transportation path even though UE is attached to a non-3GPP nodes (such as Wireless LAN).

In contrast to conventional techniques, embodiments herein provide a novel way of supplying paging notifications such as via proactive polling/retrieval. 5G Service Based Architecture can utilize the N3IWF (N3 Interworking Function) to provide a secure connection with non-3GPP network node such as Nodes (e.g. CPEs, Smart Gateway and Access Points) and User Devices (e.g. Spectrums Mobile). Secure connections can be built via a HTTPS (Hypertext Transfer Protocol) and TLS (Transport Layer Security).

The registration uses the invented interfaces, protocols and procedures between MME (Mobile Management Entity), base stations, Wireless LAN (Local Area Network) and UE when there is an alternative path through non-3GPP network (e.g. Wireless LAN and Spectrums broadband networks). The message can be encoded as micro-services messages.

Embodiments herein include switching the architecture to micro-service whenever non-3GPP connectivity is given and the signaling load is switched to non-3GPP network. The Paging is an example and the mechanism can be applied to all other signaling mechanisms.

Paging App is a micro-service in UE and in serving MME uses the invented micro-service API (Application Programming Interface) and datastore when the UE is connected to non-3GPP (3rd Generation Partnership Project) networks.

In one embodiment, a respective UE queries the SIB2 (SystemInformationBlockType2) information from an MME in a network via HTTP requests (such as request for retrieval of paging notifications to an appropriate network address of a server resource providing the paging notifications). SIB2 information from the server resource includes radio resource configuration information that is common for all UEs. The information can include access barring information, radio resource configuration of common and shared channels, timers and constants which are used by UEs, uplink power control information etc. In order to offload the MME load for all tracking areas, system can load the Wireless LAN as a proxy to play the same serving node for the micro-service. For example, the function can be serviced by a LAN virtual manager.

The resource APIs (such as a paging notification retrieval application) are used by the paging application as the mechanism with the service server. APIs are only activated when a non-3GPP network connectivity is available and its QoS is better than 3GPP. The decision to use APIs can be made by mobile communication device (user equipment) or other suitable entity.

Data Model

YANG model is used to define a resource for the paging parameters in SIB2:

BCCH-DL-SCH . . . systemInformation-r? . . . SIB2/defaultPagingCycle=<enumerated-value>, nB=<enumerated-value>

For other parameters the schema to define the resource is:

<message-name>.<parameter-name-level-1>.<parameter-name-level-2> . . . <parameter-name-level-n>/parameter-name-a=<value-a>,parameter-name-b=<value-b>

The data can be defined with the same RRC ASN.1 structure translated into YANG and the final structure defined by the YANG model can vary from the RRC.

The path starts with the message name. For example "BCCH-DL-SCH"

Parent and child parameter is separated by the "."; The resource location and parameter value assignment is separated with the "/"; two parameter values are separated with a "," The rule follows the YANG datastore API.

Embodiments herein include removing the broadcast of SIB2 paging information. Instead, the procedure includes a query from UE to the network and which may be on-demand.

Paging notification retrieval requests can be implemented via Query (GET) from UE, Informing (POST) towards network methods can be used.

Resources URI can define a part or full element of existing RRC parameters and its future extension in YANG data model.

UE Queries Paging Server for Paging Notifications

Example embodiment for an MME notifying the UE of available messages: UE sends a query method "GET" and the resource is "paging cause":

GET:http://<target-address>:BCCH-DL-SCH . . . systemInformation-r? . . . SIB 2

Response to UE is the data, in this example:

{"default Paging Cycle": "<enumerated-value>"; "nB"="<enumerated-value>"}

If UE informs networks about a measurement:

POST:http://<target-address>:MeasurementReport . . . TA

Response to UE is HTTP codes 2xx-5xx

<target-address> is the hostname or IP-address which serving the Applicant

Paging Transmission Timing

In further example embodiments, an instance of a UE supporting camping with both 3GPP and non-3GPP networks uses the paging notification function (supplemental application) to facilitate retrieval of paging notifications.

According to embodiments herein, no paging transmission timing must be calculated and no wake up synchronization between base stations and UE is needed. Discontinuous Reception (DRX) is not needed.

Instead, the UE implements the paging notification function (API or paging notification retrieval application) only when a particular type of functionality such as 3GPP network functionality is required. In one embodiment, the respective user equipment executes paging notification function when a respective UE is moving out of fixed network including the wireless LAN coverage (as small cell coverage). In one embodiment, the UE periodically monitors (polls via sending requests for paging notifications) a respective paging server for paging notifications when the UE is moving, i.e., its location is changing constantly, for example out of a wireless coverage range. Alternatively, UE detects the QoE (Quality of Experience), quality of service, performance associated with the current wireless communication link, etc., is below a threshold level with respect to use of a fixed network connectivity and then activates the paging notification application.

In one embodiment, the implementation of the paging notification function and related operations as discussed herein to poll a respective server for paging notifications enables the UE to retrieve its paging notifications as opposed to conventional monitoring paging occasions in a dedicated wireless channel shared by multiple mobile communication devices.

Figure 3:
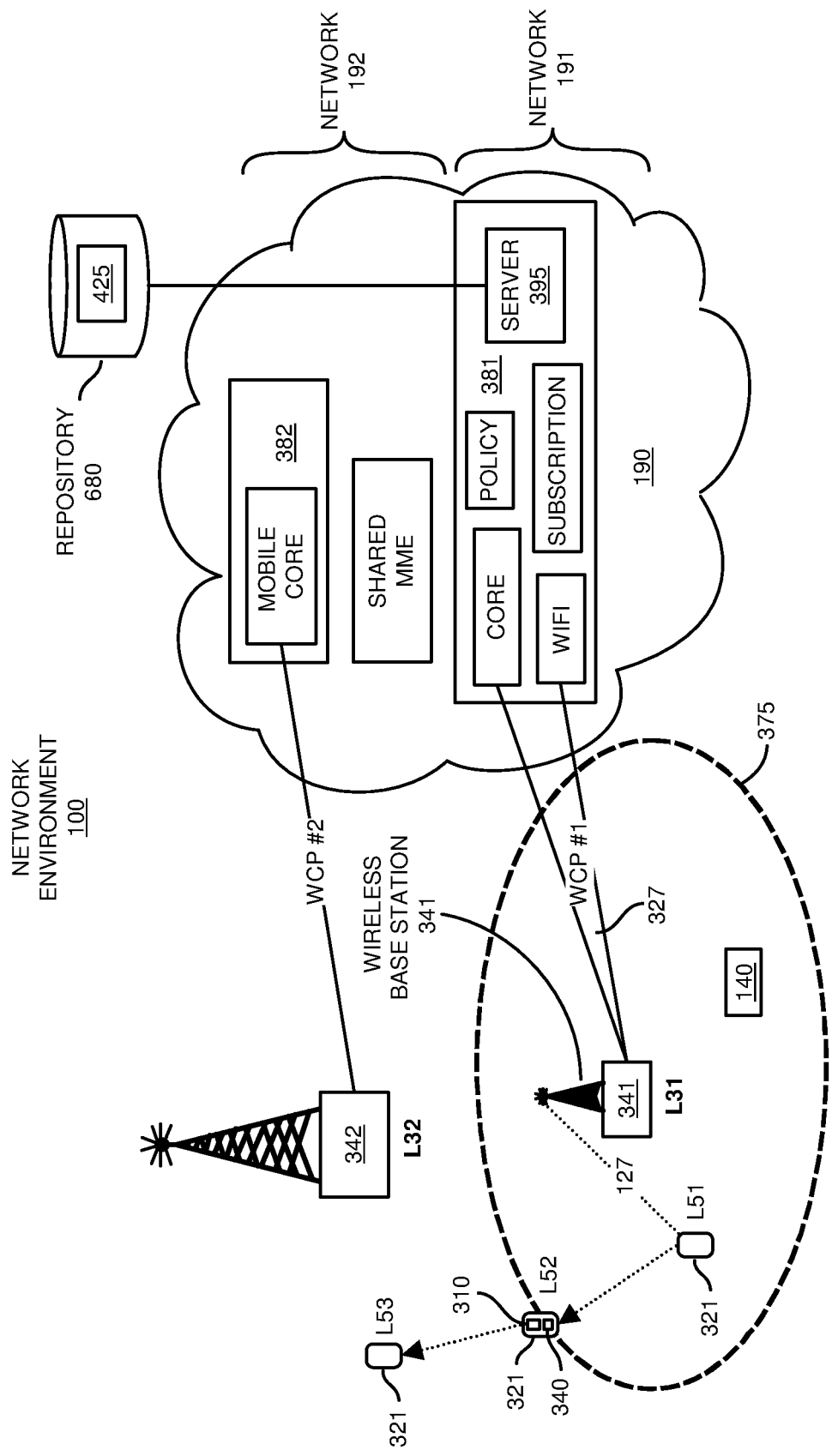
FIG. 3 is an example diagram illustrating implementation of a paging application and corresponding paging notification retrieval according to embodiments herein.

Now, with reference to the drawings, FIG. 3 is an example diagram illustrating implementation of a paging application and corresponding paging notification retrieval according to embodiments herein.

As shown in FIG. 3, wireless network environment 100 includes a first wireless network 191 supporting and/or including wireless station 341, a second wireless network 192 supporting and/or including wireless station 342, and mobile communication device 321 (i.e., user equipment).

Mobile communication device 321 implements communication management resource 340 to manage connectivity between the mobile communication device 321 and the wireless base station 341. Mobile communication device 321 further includes communication management function 310 (such as a paging notification retrieval application) to facilitate retrieval of communication management messages as further discussed herein.

In this example embodiment, wireless network 191 supports wireless communication protocol #1 (such as Wi-Fi™ or other suitable wireless communication protocol) and includes communication management resource 381 providing one or more mobile communication devices access to a remote network 190 such as the Internet, cellular network, etc.

Wireless network 192 supports wireless communication protocol #2 (such as cellular wireless communication protocol based on 5G or other suitable wireless communication protocol) and includes communication management resource 382 providing one or more mobile communication devices access to a remote network 190 such as the Internet, cellular network etc.

Note that any of the resources as discussed herein can be implemented via hardware, software, or a combination of hardware and software. More specifically, communication management resource 340 can be implemented as communication management hardware, communication management system, or a combination of communication management hardware and communication management software; communication management function 310 can be implemented as communication management hardware, communication management software, or a combination of communication management hardware and communication management software; etc.

Further in this example embodiment, as previously discussed, the mobile communication device 321 (a.k.a., user equipment) includes a communication management resource 340 (such as implemented via hardware and/or software) to manage connectivity with the network 190. For example, in this example embodiment, the communication management resource 340 of the mobile communication device 321 initially establishes a wireless communication link 127 between the mobile communication device 321 and the first wireless station 341. While the mobile communication device 321 is at location L51, the first wireless station 341 (and corresponding first network 191 supporting a first wireless communication protocol) provides the mobile communication device 321 access to a remote network 190 (such as one or more of the Internet, cellular wireless network, etc.) via the wireless communication link 127.

Eventually, while roaming from location L51 to L53, the mobile communication device 321 roams to location L52 such as at or near an edge of the region of wireless coverage 375 provided by the wireless station 341 as shown in FIG. 3.

Because the wireless station 341 provides poor wireless coverage (wireless power level of wireless communications received from the wireless base station 341 fall below a threshold level) to the mobile communication device 321 at or near location L52 and no wireless coverage when the mobile communication device 321 is outside of the region of wireless coverage 375, assume that the communication management resource 340 of the mobile communication device 321 or other suitable entity determines to handoff the respective wireless communication link 127 to the wireless station 341 as the mobile communication device moves from location L51 to location L53.

In one embodiment, the wireless communication link 127 and corresponding communication management resource 381 support wireless communication protocol #1, which does not require and/or support use of paging notifications while the mobile communication device 321 resides only in the region of wireless coverage 375. In contrast to wireless communication protocol #1, the wireless communication protocol #2 itself implements paging notifications. For example, the wireless communication protocol #2 includes a dedicated paging notification wireless channel to communicate paging notifications to the mobile communication device 321 and other mobile communication devices in wireless network environment 100.

In further example embodiments, to retrieve link management communications (communication management messages) such as paging notifications associated with a handoff of the mobile communication device 321 from the wireless station 341 and communication management resource 381 to wireless station 342 and communication management resource 382, the communication management resource 340 initiates execution of communication management function 310 (such as paging notification retrieval application or other suitable entity).

For example, via the executed communication management function 310 such as triggered by being near the edge of region of wireless coverage 375, the communication management resource 340 associated with the mobile communication device 321 communicates with a remote entity such as paging notification server 395 to retrieve link management information (communication management messages) such as paging notifications associated with the mobile communication device 321 and corresponding wireless communication link 127 when handing of the wireless communication link 127 from the wireless station 341 to wireless station 342.

In one embodiment, as further discussed herein, subsequent to the handoff, the wireless communication link 127 between the mobile communication device 321 and the wireless station 342 (wireless network 192) supports wireless communication protocol #2.

As previously discussed, in one embodiment, the wireless communication protocol #2 itself supports conveyance of communication management messages (such as paging notifications) to the mobile communication device 321, alleviating the need for the communication management function 310 to continue to retrieve the paging notifications from the server 395. However, if desired, the communication management resource 321 can execute the communication management function 310 at any time to retrieve communication management messages associated with the network 191 or network 192.

In a manner as previously discussed, in one embodiment, the wireless station 342 broadcasts paging notifications (communication management messages) over a dedicated downlink wireless channel to the one or more mobile communication devices in the network environment 100. Each of the mobile communication devices (such as including mobile communication device 321) is assigned a time slot in which to monitor and determine if paging notifications are available for the mobile communication device 321.

Thus, in one embodiment, the mobile communication device 321 (user equipment) is initially provided access via wireless network 191 (network supporting a non-GPP wireless communication protocol without a paging notification channel) while at location L51. Instead of using a dedicated wireless paging notification channel, the communication management resource 381 of the wireless network 191 provides paging notifications or other communication link control/status information to the mobile communication device 321 in response to requests communicated to the server 395.

In further example embodiments, the management functions associated with both wireless network 191 and wireless network 192 communicate with each other to coordinate generation and distribution of relevant paging notifications to the mobile communication device 321 over a dedicated wireless channel monitored by the mobile communication device 321 or distribution of paging notifications via the mobile communication device 321 communicating a request to a unique identifier value (such as network address) assigned to the server resource 395 for paging notifications.

Figure 4:
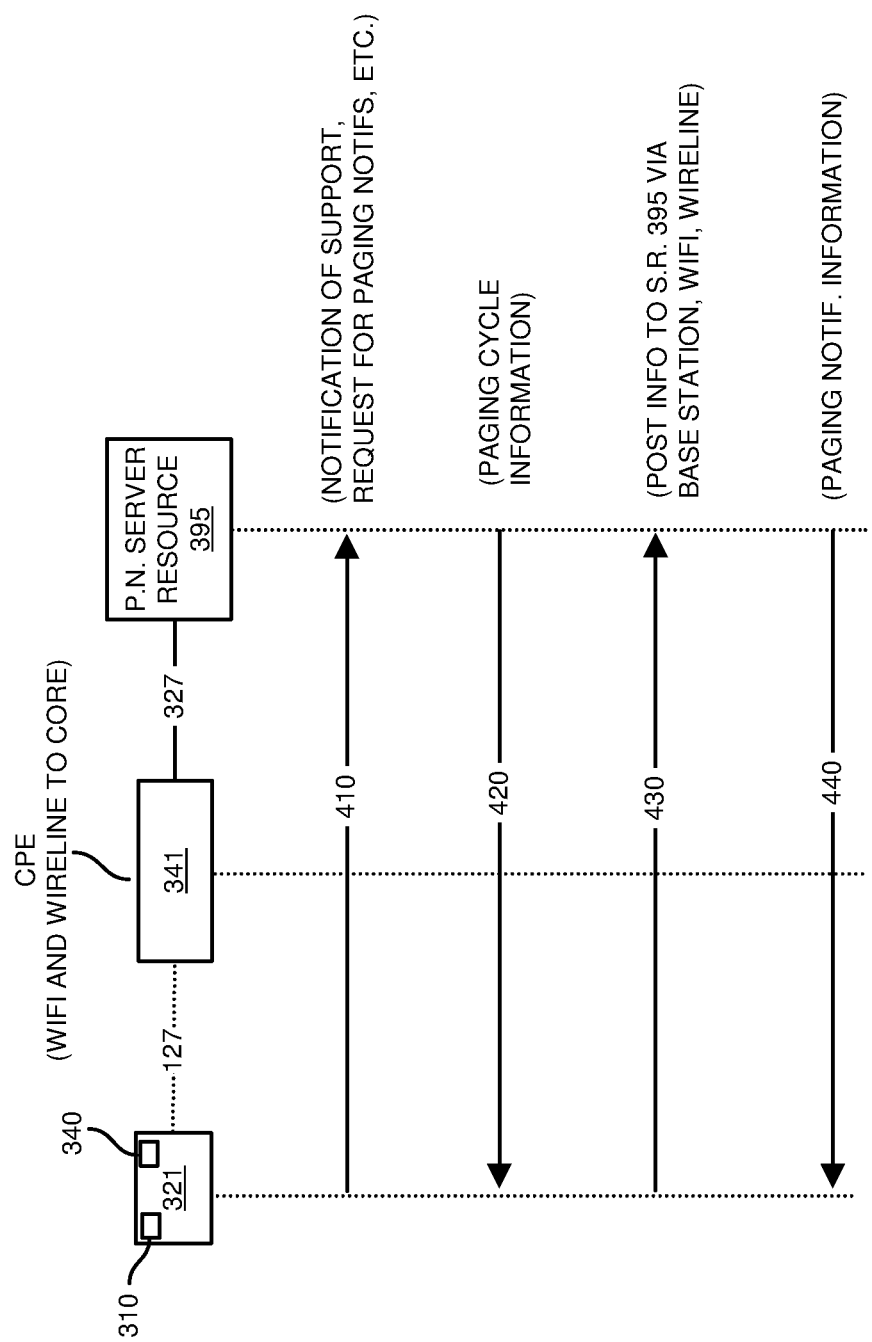
FIG. 4 is an example diagram illustrating communications associated with retrieval of paging notification communications according to embodiments herein.

FIG. 4 is an example diagram illustrating communications associated with retrieval of wireless paging notification communications (communication management messages) according to embodiments herein.

In this embodiment, as previously discussed, during a trigger condition such as handoff of the mobile communication device 321 and corresponding wireless communication link 127 from the wireless station 341 of wireless network 191 to wireless station 342 of wireless network 192, the communication management resource 340 executes the communication management function 310.

In response to execution of the communication management function 310 and detected condition, via communications 410 over the wireless communication link 127 through wireless base station 341, the communication management function 310 provides notification of support of requests for communication management messages (paging notifications) to the communication management resource 381 and/or communication management resource 382 such as including message server resource 395. In one embodiment, this includes generating communications 410 to include a message directed to a network address of a mobile management entity (in wireless network 191 and wireless network 192) facilitating the handoff such as GET:http//<MME-address>:BCH-DL-SCH . . . systeminformation-r? . . . SIB2. In one embodiment, the communications 410 include a request for paging notifications associated with the mobile communication device 321.

Via communications 420 over communication link 327 and wireless communication link 127, the mobile management entity (such as paging notification server resource 395) such as associated with wireless network 191 or wireless network 192 (or both) supplies paging cycle information (such as "default Paging Cycle": "<enumerated value>"; "nB"="<enumerated value>") to the communication management function 310.

Via communications 430 over wireless communication link 127 and communication link 327, the communication management function 310 posts information to the wireless base station and paging notification server resource 395 to retrieve communication management messages (such as paging notifications). The core network 192 uses the information in communications 430 to supply paging notifications to the communication management resource 310. For example, in one embodiment, the communication management function 310 communicates post information such as POST:http://<mme-address>:BCCH-DL-SCH . . . <message-name>.<parameter-name level 1>.<parameter-name level 2> . . . <parameter-name level n>/parameter-name-a=<value-a>. <parameter-name-b=<value-b>.

Via communications 440 over communication link 327 and the wireless communication link 127, in response to setting up (configuring paging notification retrieval as previously discussed via communications 410, 420, and 430) paging notification retrieval and request for communication management information such as paging notifications, the server resource 395 communicates respective communication management message (such as paging notifications) to the communication management function 310.

Thus, in contrast to conventional techniques in which a respective mobile communication device monitors an assigned channel and time slots (paging occasions) to learn of paging notifications, the mobile communication device 231 and corresponding communication management function 321 communicates a request to a network address assigned to the paging notification server resource 395 for paging notifications via client server connectivity. The communication management messages can be used for any suitable purposes such as maintain wireless connectivity of the mobile communication device 321 with the remote network 190 through one or more wireless base stations.

In one embodiment, the communication management resource 382 and/or wireless network 192 generates communication management messages 425 for the mobile communication device 321 in response to the mobile communication device 321 attempting to establish a respective wireless communication link 127 between the mobile communication device 321 and the wireless base station 342 and/or wireless network 192. Additionally, or alternatively, the communication management resource 381 and/or wireless network 191 generates communication management messages 425 for the mobile communication device 321 in response to the mobile communication device 321 attempting to establish a respective wireless communication link 127 between the mobile communication device 321 and the wireless base station 342 and/or wireless network 192. In one embodiment, the communication management messages 425 facilitate a respective handoff of the mobile communication device and corresponding wireless communication link 127 from the first wireless base station 341 to the second wireless base station 342.

Figure 5:
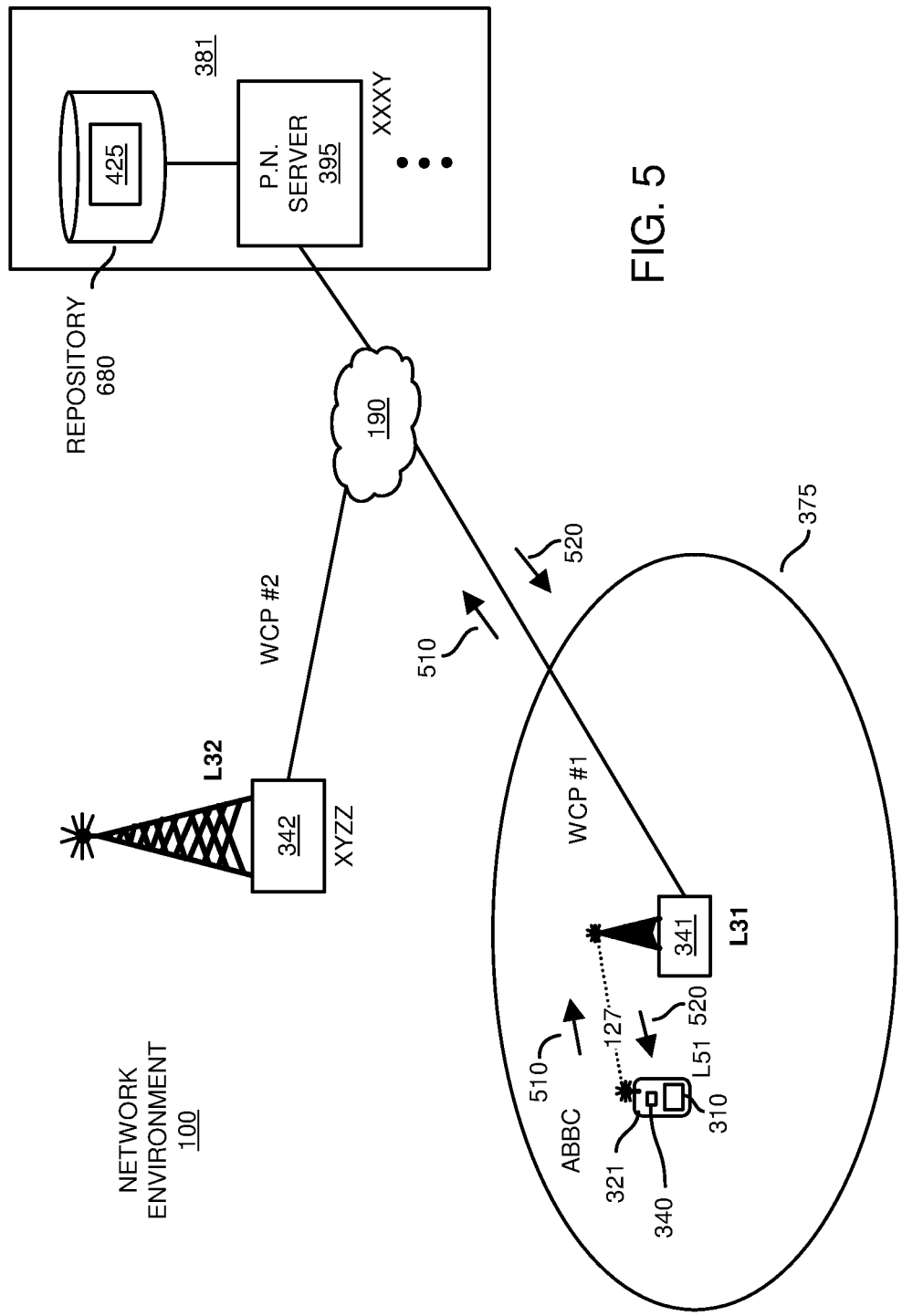
FIG. 5 is an example diagram illustrating wireless connectivity providing access to a network according to embodiments herein.

FIG. 5 is an example diagram illustrating wireless connectivity providing access to a network according to embodiments herein.

As shown in FIG. 5, the communication management resource 340 of the mobile communication device (i.e., wireless station) establishes a respective wireless communication link 127 with the wireless station 341 (such as customer premises equipment or other suitable entity) disposed at location L31.

In one embodiment, the wireless communication link 127 is a secured connection between the mobile communication device 321 and the wireless station 341.

In this example embodiment, the paging notification server 395 includes repository 680 to store communication management message 425 (paging notifications or other suitable information) assigned to the mobile communication device 341 and other mobile communication devices in the wireless network environment 100.

In one embodiment, the communication management resource 340 monitors a quality of the wireless communication link 127 between the user equipment 321 and the wireless station 341. In further example embodiments, the communication management resource 341 initiates execution of the communication management function 310 based on the quality of the wireless communication link. For example, in one embodiment, if the communication management resource 340 of the mobile communication device 321 detects a performance parameter falling below a threshold level (such as bit rate, wireless power level of receiving communications from the wireless station 341, etc., falling below a threshold level), the communication management resource 340 or other suitable entity in the network environment 100 initiates execution of the communication management function 310 and/or respective handoff of the mobile communication device 321 from the wireless network 191 to the wireless network 192.

Thus, embodiments herein include, via the communication management resource 340, initiating execution of the communication management function 310 in response to detecting that a quality of the wireless communication link 127 falls below a threshold level.

As further discussed below, embodiments herein include, via the communication management resource 340 associated with the mobile communication device 321, initiating execution of the communication management function 310 in response to detecting mobility and/or presence of the mobile communication device 321 at or near an edge of the region of wireless coverage 375.

Via wireless communication link 127 (wireless communication protocol #1 such as Wi-Fi™ or other suitable type not supporting paging notifications over a dedicated paging notification wireless channel), the mobile communication device 321 has access to the network 190 and corresponding one or more server resources, mobile communication devices, etc.

As shown, via uplink communications 510, the mobile communication device 321 communicates data over wireless communication link 127 through wireless station to the remote network 190. Via downlink communications 520, the one or more server resources in network 190 communicate data through wireless station and over wireless communication link 127 to the mobile communication device 321.

In further example embodiments, note that the implementation of the communication management function 321 and retrieval of corresponding communication management messages is supplemental to a respective wireless paging channel supported by the corresponding wireless communication protocol. In other words, use of the communication management function 310 can be used to supplemental receipts of paging notifications via assigned paging occasions.

Figure 6:
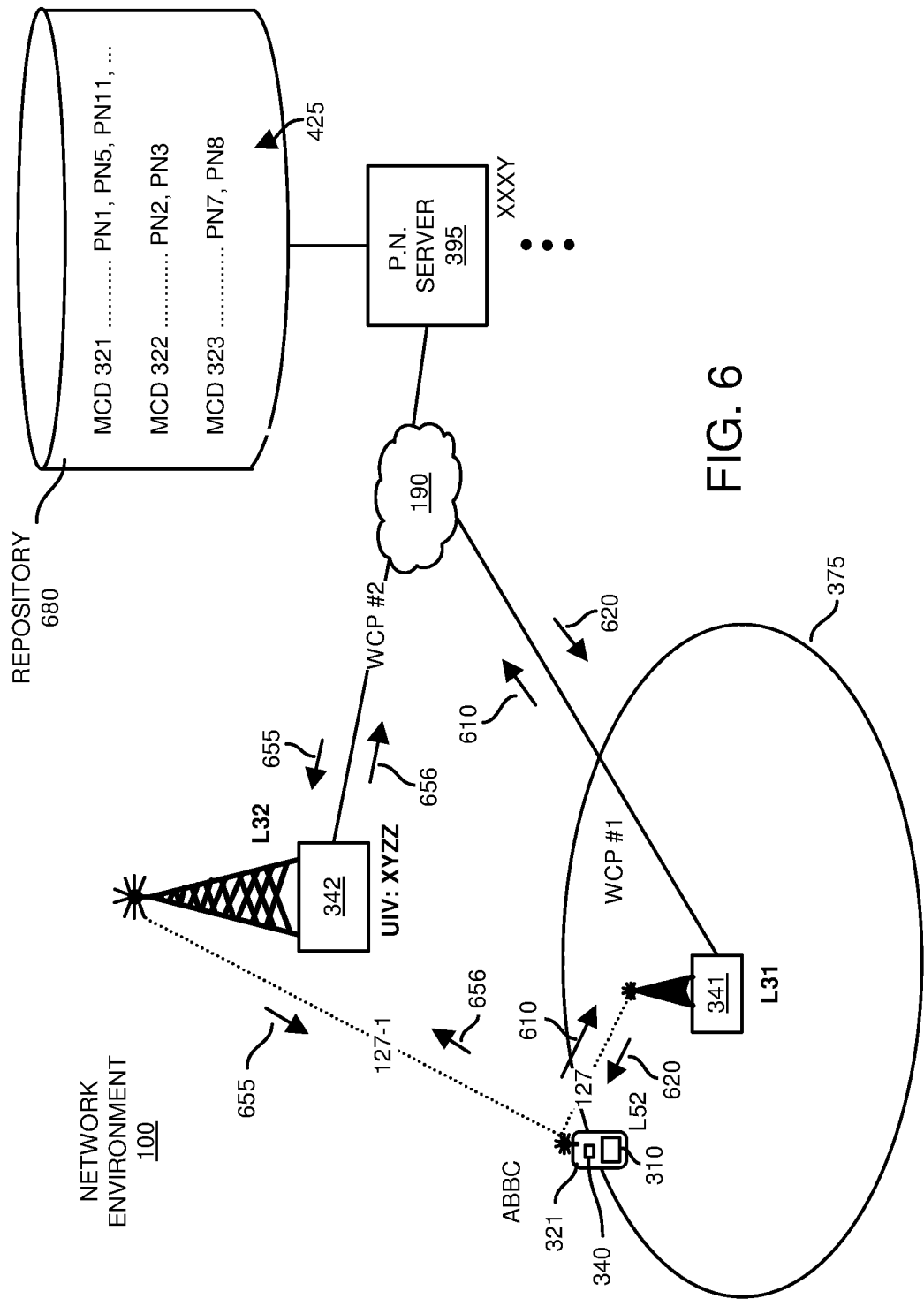
FIG. 6 is an example diagram illustrating execution of a paging notification function to facilitate a handoff of a mobile communication device from a first wireless station to a second wireless station according to embodiments herein.

FIG. 6 is an example diagram illustrating execution of a paging notification function to facilitate a handoff of a mobile communication device from a first wireless station to a second wireless station according to embodiments herein.

Subsequent to the communication management resource 340 activating the communication management function 310 because the communication management resource 340 detects the mobile communication device 321 leaving the region of wireless coverage 375, the communication management function 310 communicates with the paging notification server 395 to retrieve paging notifications directed to it to facilitate a soft handoff of the mobile communication device 321 from the wireless station 341 and corresponding wireless communication link 127 to the wireless base station 342.

As previously discussed, an example of the operations in FIG. 4 are carried out via communications 610 and communications 620 in FIG. 6.

For example, as previously discussed, the communication management function 310 in the mobile communication device 321 communicates communications 610 (such as communications 410 in FIG. 4) to target network address XXXY through the wireless base station 341 to the server resource 395. These communications provide notification of support of requests for communication management messages (paging notifications) to the communication management resource 381 in network 191 and/or communication management resource 382 such as including message server resource 395.

Via communications 620 (such as communications 420 in FIG. 4) over communication link 327 and wireless communication link 127, the mobile management entity (such as paging notification server resource 395) such as associated with wireless network 191 or wireless network 192 (or both) supplies paging cycle information (such as "default Paging Cycle": "<enumerated value>"; "nB"="<enumerated value>") to the communication management function 310.

Via further communications 610 (such as communications 430 in FIG. 4) over wireless communication link 127 and communication link 327, the communication management function 310 posts information to the wireless base station and paging notification server resource 395 to retrieve communication management messages (such as paging notifications). The communication management resource 381 and corresponding server resource 395 use the information in communications 610 to supply paging notifications to the communication management resource 310. For example, in one embodiment, the communication management function 310 communicates post information such as POST:http://<mme-address>:BCCH-DL-SCH . . . <message-name>.<parameter-name level 1>.<parameter-name level 2> . . . <parameter-name level n>/parameter-name-a=<value-a>. <parameter-name-b=<value-b>.

Via further communications 620 (such as communications 440 in FIG. 4) over communication link 327 and the wireless communication link 127, in response to setting up (configuring paging notification retrieval as previously discussed via communications 410, 420, and 430) of paging notification retrieval and request for communication management information in prior communications, the server resource 395 communicates respective one or more communication management message (such as paging notifications) to the communication management function 310.

Thus, the communications from the mobile communication device 321 and corresponding communication management function 310 cause the server resource 395 to distribute the paging notifications to the communication management function 310 of the mobile communication device 321.

In one embodiment, via communications 610, the communication management function 310 effectively communicates a request message from the mobile communication device 321 (user equipment) over the wireless communication link 127 to the paging notification server resource 395 (remote entity such as communication management message server); the request communications request retrieval of any available paging notifications assigned to the mobile communication device 321. As previously discussed, in one embodiment, the user equipment is operative to execute the communication management function 310 during a handoff of the user equipment from the first wireless station 341 to a second wireless station 342.

In one embodiment, the mobile communication device 321 is simultaneously connected to both the wireless base station 341 via communication link 127 and wireless base station 342 via wireless communication link 127-1. At such time, the wireless base station 342 can be configured to notify the mobile communication device 321 to monitor paging occasions of a wireless paging channel communicated from the wireless base station 342 to the mobile communication device 310. The paging occasions notify the mobile communication device 321 of paging notifications available through the wireless base station 342. Additionally, as discussed herein, the mobile communication device 321 can be configured to communicate with the paging notification server resource 395 to retrieve communication management messages 425 directed to the mobile communication device 321. Thus, the mobile communication device 321 can be configured to receive and retrieve communication management messages from multiple wireless base stations.

In one embodiment, the communicated request in communications 610 include a source network address ABBC (unique network identifier value) of the mobile communication device 321 sending the request as well as a target destination network address XXXY assigned to the paging notification server resource 395. The wireless station 341, network 190, wireless network 191, etc., route the request in communications 610 from the mobile communication device 321 to the server resource 395 via the network address information.

Based on the request or requests in communications 610, the paging notification server resource 395 identifies which of the information (communication management messages) in repository 680 are stored on behalf of or assigned to the mobile communication device 321.

In this example embodiment, the paging notification server resource 395 uses the identity of the mobile communication device 321 (as indicated by the source network address ABBC) to retrieve and forward paging notifications to the mobile communication device 321. For example, the paging notification server resource 395 maps the network address ABBC of the mobile communication device 321 (or other suitable unique identifier value associated with the communications received from the mobile communication device 321) to the communication management messages such as paging notifications PN1, PN5, PN11, etc.

In a reverse direction, in response to receiving a respective request for paging notifications, the paging notification server resource 395 communicates the paging notifications associated with the mobile communication device 321 to the communication management function 310 of the mobile communication device 321. For example, via communications 620 having a destination network address of ABBC, the paging notification server resource 395 communicates the paging notifications PN1, PN5, PN11, etc., to the mobile communication device 321.

In this manner, the communication management function 310 of the mobile communication device 321 is able to repeatedly retrieve the communication management messages stored in repository 680 as they become available.

As further shown, the wireless communication protocol #2 implemented by the wireless network 192 (such as including wireless station 342) supports communication of paging notifications associated with the wireless network 192 to the mobile communication device 321. In contrast to the proactive retrieval of paging notifications via communications 610 and 620, in one embodiment, the wireless station 342 dedicates a respective wireless paging channel monitored by the mobile communication device 321. The wireless station 342 notifies the mobile communication device 321 which of multiple paging occasions (time slots of different timeframes) of paging channel 620 in which to monitor for notification of paging notifications directed to the mobile communication device 321.

Accordingly, embodiments herein include the mobile communication device 321: i) receiving first paging notifications in time slots of a paging channel 655 assigned to and monitored by the mobile communication device 321; and ii) retrieving second paging notifications from paging notification server resource 395 via the executed communication management function 310.

Figure 7:
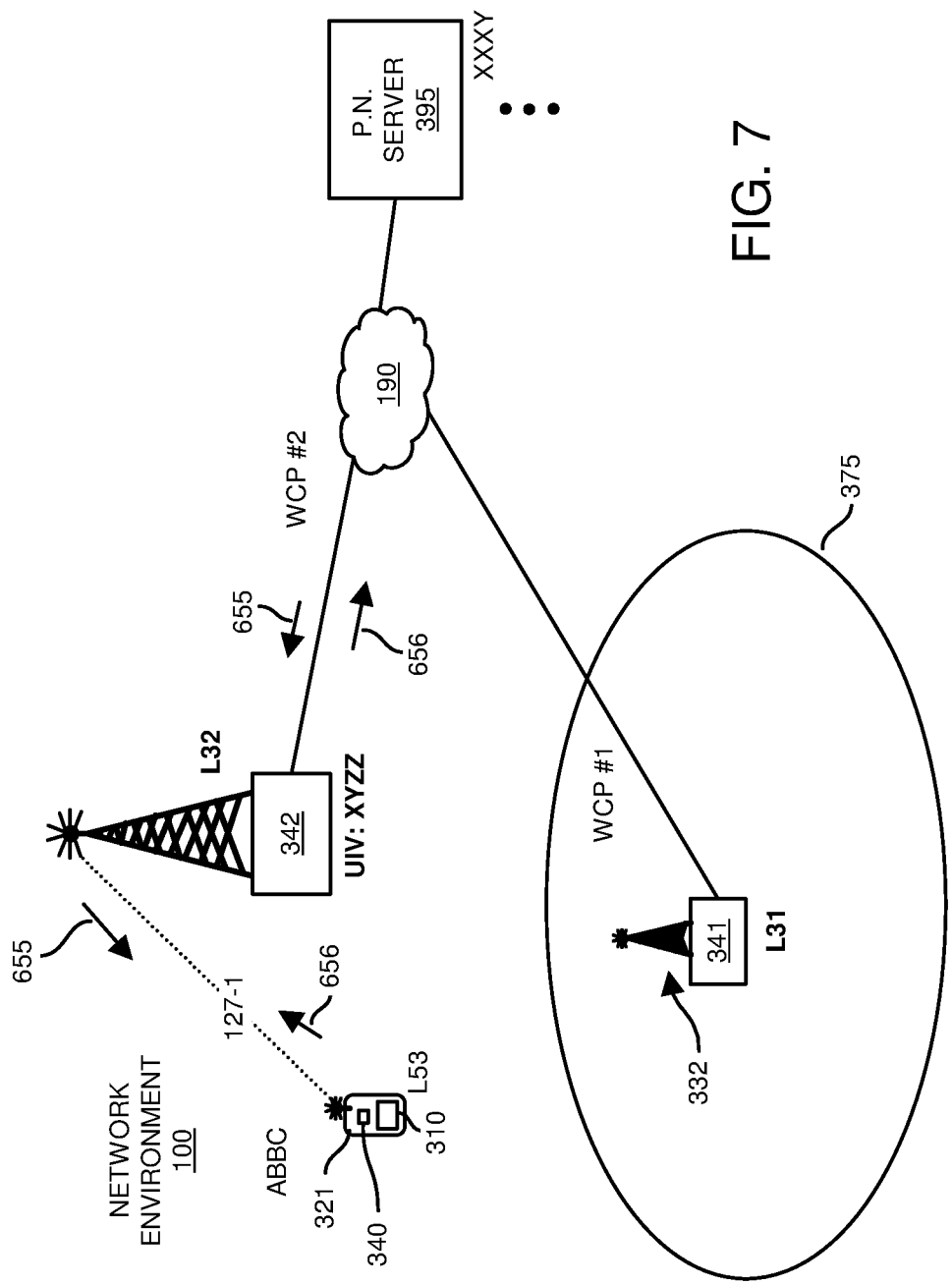
FIG. 7 is an example diagram illustrating connectivity of a respective mobile communication device after a handoff according to embodiments herein.

FIG. 7 is an example diagram illustrating connectivity of a respective mobile communication device after a handoff according to embodiments herein.

The mobile communication device 321 continues to move to location L52 to location L53. While at location L53, the handed off wireless communication link 127-1 provides wireless connectivity of mobile communication device 321 to the wireless base station 342 and corresponding remote network 190.

Subsequent to a respective handoff of the wireless communication link 127 and the corresponding mobile communication device 321 from the wireless station 341 to the wireless station 342, the mobile communication device 321 monitors the paging channel 655 for paging notifications communicated to itself. Because the mobile communication device 321 resides outside the region of wireless coverage 375, the mobile communication device no longer communicates through the wireless station 341 to retrieve paging notifications from the paging notification server resource 395.

As previously discussed, if desired, the wireless network 192 can be configured to provide one or more communication management messages to the paging notification server resource 395 or other suitable entity via the communication management function 310 in a manner as previously discussed.

Figure 8:
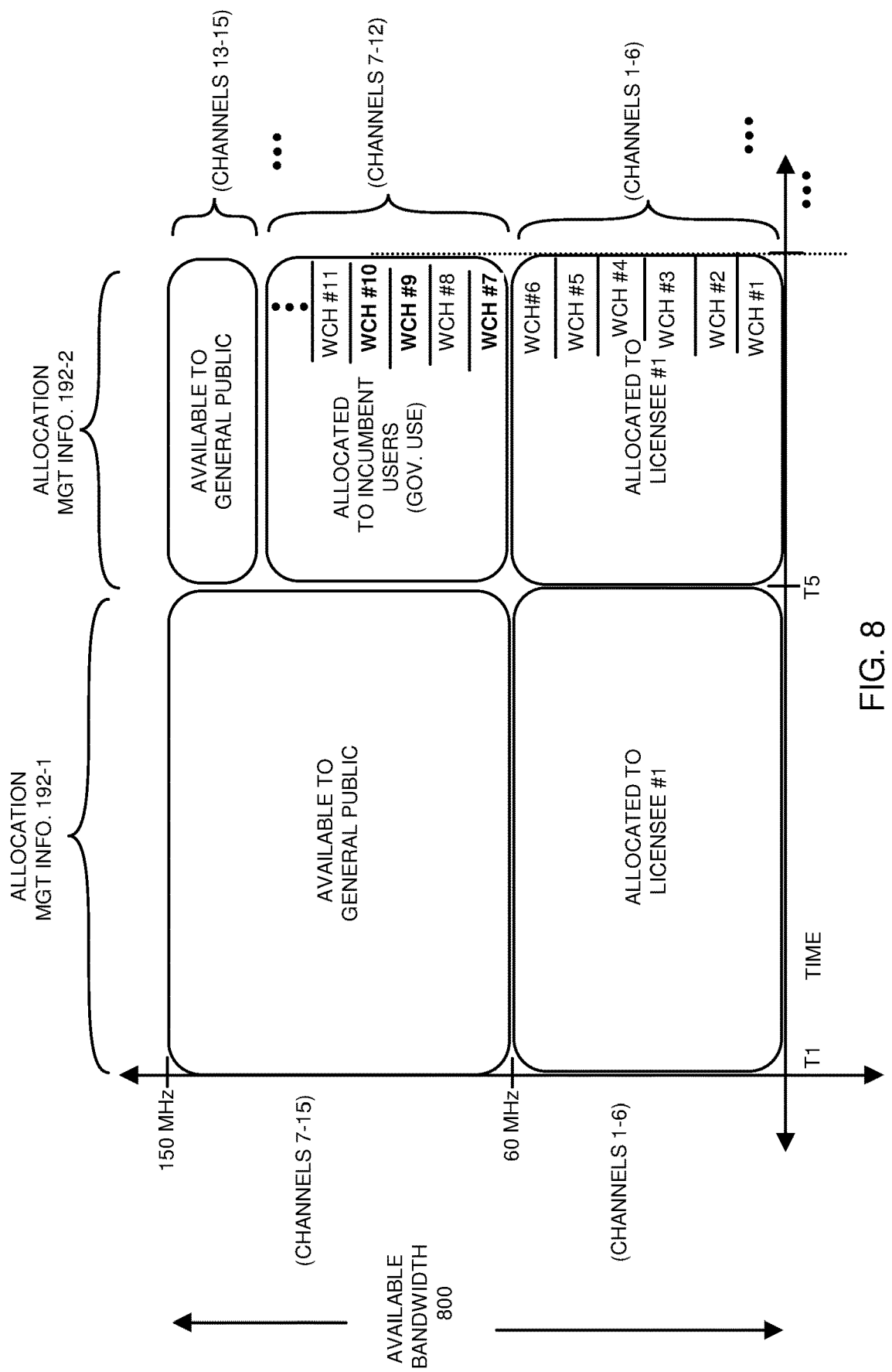
FIG. 8 is an example diagram illustrating a wireless spectrum from which wireless channels are allocated and deallocated according to embodiments herein.

FIG. 8 is an example diagram illustrating generation of dynamic channel allocation information indicating allocation of bandwidth at different tiers of a channel hierarchy according to embodiments herein.

As previously discussed, allocation management resource 140 can be configured to allocate any suitable type of wireless spectrum (bandwidth, wireless channels, etc.) for use by the communication devices such as wireless base stations, customer premises equipment, etc., in the network environment 100.

In one non-limiting example embodiment, the allocation management resource 140 allocates bandwidth (wireless channels) to the one or more wireless stations (such as wireless base station 341) in the region of wireless coverage 375 such as from a so-called CBRS (Citizens Band Radio System) band operating between 3.550 and 3.700 GHz (GigaHertz) (such as 150 MegaHertz or 15 wireless channels that are each 10 MHz wide).

Also, allocation management resource 140 (such as spectrum access system or other suitable entity) keeps track, at any given time, which wireless channels or portions of the multi-tier wireless spectrum or multi-tier radio band (such as CBRS band) are available in the geographical region in which the network environment 100 resides. If government use (such as via a so-called incumbent user) is detected or requested via appropriate input (such as around time T5) to the allocation management resource 140, certain channels (such as those used by the general public) are no longer available for use as shown in the content access information 192-2.

More specifically, in this example, the allocation management information 192-1 (a first instance of allocation management information) indicates that between time T1 and time T5, channels 7-15 are available to the general authorized access users (general public or low priority users) for use; channels 1-6 are available for use by licensee #1. In a manner as previously discussed, these channels are allocated for use by the wireless base stations in network environment 100.

As further shown, at or around time T5, assume that the communication management resource 140 receives input indicating use of a portion (channels 7-12) of the spectrum by an incumbent user such as the government. In such an instance, the allocation management resource 140 updates the channel allocation information such that the allocation management information 192-2 indicates that only channels 13-15 are allocated as being available to the general authorized access users; channels 7-12 are assigned for use by an incumbent entity requesting use or actually using the channels; wireless channels 1-6 are allocated for use by a first licensee. Thus, after time T5, the wireless channels 7-12 are no longer available for use by the lower priority users (i.e., general authorized access users) such as wireless base station 131 or wireless base station 431 (whichever happens to be operating at the time).

In one embodiment, in response to revocation of the allocation of wireless channels 7-12, the communication management resource 140 notifies a respective wireless base station at or around time T5 that the wireless base station 131 is no longer able to use wireless channel #7, #8, #9, and #10 because these channels have been revoked and assigned for use by the incumbent user.

Thus, between time T1 and time T5, a wireless base station uses the wireless channels #7, #8, #9, #10, etc., to provide wireless service to the communication devices. At or around time T5, the communication management resource 140 deallocates use of the wireless channels #7, #8, #9 and #10 from the wireless base station in favor of use of the wireless channels #7, #8, #9, and #10 being used by or allocated to the incumbent user after time T5.

This illustrates the dynamic availability of different wireless channels bandwidth in a hierarchy as shared in network environment 100. For example, if communication management resource 140 allocates use of wireless channels #7-12 in the hierarchy of available channels to any of one or more base stations, communication devices, etc., then the communication management resource 140 must de-allocate use of such wireless channels during conditions in which a higher priority so-called incumbent user relinquishes use of wireless channels 7-12 at or around time T5. In such an instance, as previously discussed, the communication management resource 140 deallocates the wireless channels 7-12 from respective wireless stations for use instead by the incumbent user (higher priority user).

Figure 9:
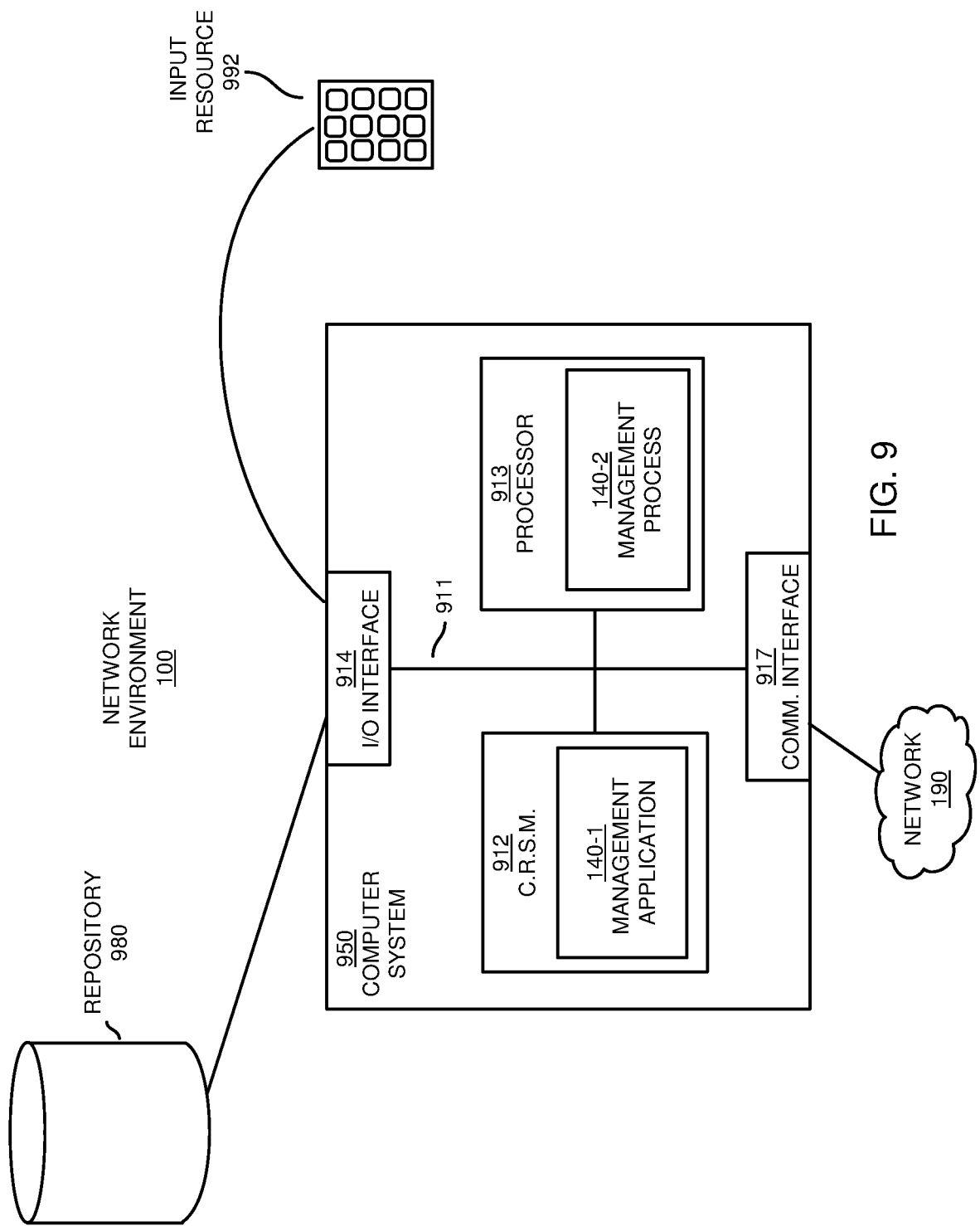
FIG. 9 is an example diagram illustrating example computer hardware and software operable to execute one or more operations according to embodiments herein.

FIG. 9 is an example block diagram of a computer system for implementing any of the operations as previously discussed according to embodiments herein.

Any of the resources (such as communication management resource 340, wireless station 341, wireless station 342, allocation management resource 140, paging notification server resource 395, etc.) as discussed herein can be configured to include computer processor hardware and/or corresponding executable instructions to carry out the different operations as discussed herein.

As shown, computer system 950 of the present example includes interconnect 911 coupling computer readable storage media 912 such as a non-transitory type of media (which can be any suitable type of hardware storage medium in which digital information can be stored and or retrieved), a processor 913 (computer processor hardware), I/O interface 914, and a communications interface 917.

I/O interface(s) 914 supports connectivity to repository 980 and input resource 992.

Computer readable storage medium 912 can be any hardware storage device such as memory, optical storage, hard drive, floppy disk, etc. In one embodiment, the computer readable storage medium 912 stores instructions and/or data.

As shown, computer readable storage media 912 can be encoded with management application 140-1 (e.g., including instructions to execute any of the operations associated with the communication management resource 340, wireless station 341, wireless station 342, paging notification server resource 395, allocation management resource 140, etc.) in a respective entity to carry out any of the operations as discussed herein.

During operation of one embodiment, processor 913 accesses computer readable storage media 912 via the use of interconnect 911 in order to launch, run, execute, interpret or otherwise perform the instructions in management application 140-1 stored on computer readable storage medium 912. Execution of the management application 140-1 produces management process 140-2 to carry out any of the operations and/or processes as discussed herein.

Those skilled in the art will understand that the computer system 950 can include other processes and/or software and hardware components, such as an operating system that controls allocation and use of hardware resources to execute management application 140-1.

In accordance with different embodiments, note that computer system may reside in any of various types of devices, including, but not limited to, a mobile computer, a personal computer system, a wireless device, a wireless access point, a base station, phone device, desktop computer, laptop, notebook, netbook computer, mainframe computer system, handheld computer, workstation, network computer, application server, storage device, a consumer electronics device such as a camera, camcorder, set top box, mobile device, video game console, handheld video game device, a peripheral device such as a switch, modem, router, set-top box, content management device, handheld remote control device, any type of computing or electronic device, etc. The computer system 950 may reside at any location or can be included in any suitable resource in any network environment to implement functionality as discussed herein.

Functionality supported by the different resources will now be discussed via flowcharts in FIG. 10. Note that the steps in the flowcharts below can be executed in any suitable order.

Figure 10:
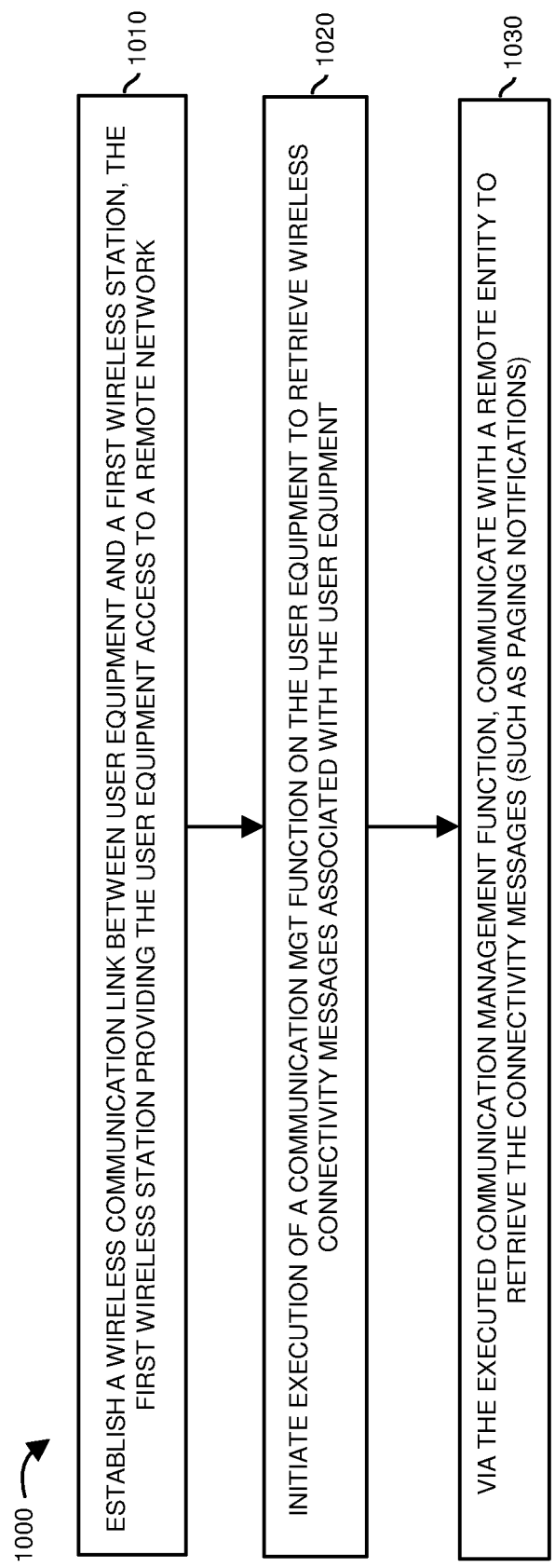
FIG. 10 is an example diagram illustrating a method according to embodiments herein.

FIG. 10 is an example diagram illustrating a method according to embodiments herein. Note that there will be some overlap with respect to concepts as discussed above.

In processing operation 1010 of flowchart 1000, the mobile communication device 321 (a.k.a., user equipment) establishes a wireless communication link 127 between the mobile communication device 321 and a first wireless station 341. The first wireless station 341 provides the mobile communication device 321 access to a remote network 190.

In processing operation 1020, the communication management resource 340 of the mobile communication device 321 initiates execution of a communication management function 310 (such as paging notification retrieval application) on the mobile communication device 321.

In processing operation 1030, via the executed communication management function 310, the mobile communication device 321 communicates with a remote entity such as paging server 395 to retrieve communication management messages (such as paging notification PN1, PN5, PN11, etc.) associated with accessing the remote network 190.

Note again that techniques herein are well suited to facilitate use of a shared wireless channel amongst different types of wireless stations. However, it should be noted that embodiments herein are not limited to use in such applications and that the techniques discussed herein are well suited for other applications as well.

Based on the description set forth herein, numerous specific details have been set forth to provide a thorough understanding of claimed subject matter. However, it will be understood by those skilled in the art that claimed subject matter may be practiced without these specific details. In other instances, methods, apparatuses, systems, etc., that would be known by one of ordinary skill have not been described in detail so as not to obscure claimed subject matter. Some portions of the detailed description have been presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm as described herein, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has been convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a computing platform, such as a computer or a similar electronic computing device, that manipulates or transforms data represented as physical electronic or magnetic quantities within memories, registers, or other information storage devices, transmission devices, or display devices of the computing platform.

While this invention has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting. Rather, any limitations to the invention are presented in the following claims.

The invention claimed is:

1. A method comprising:
   establishing a wireless communication link between user equipment and a first wireless station, the first wireless station providing the user equipment access to a remote network over the wireless communication link;
   initiating execution of a communication management function on the user equipment;
   via the communication management function executed on the user equipment, communicating a request message from the user equipment over the wireless communication link to a remote entity to retrieve paging notifications associated with the user equipment; and
   wherein communicating the request message includes: communicating the request message over the wireless communication link to a network address assigned to the remote entity to retrieve the paging notifications.

2. The method as in claim 1 further comprising:
   monitoring a quality of the wireless communication link between the user equipment and the first wireless station; and
   initiating execution of the communication management function based on the quality of the wireless communication link.

3. The method as in claim 1 further comprising:
   initiating execution of the communication management function on the user equipment to retrieve the paging notifications in response to detecting that a quality of the wireless communication link falls below a threshold level.

4. The method as in claim 1 further comprising:
   initiating execution of the communication management function in response to detecting mobility of the user equipment.

5. The method as in claim 1, wherein the first wireless station resides in a first wireless network, the first wireless station in the first wireless network providing the user equipment access to the remote network via the wireless communication link; and wherein the paging notifications are directed to the user equipment from a second wireless network different than the first wireless network.

6. The method as in claim 5 further comprising:
receiving multiple instances of the paging notifications, the multiple instances of the paging notifications received from multiple different sources over different network communication layers.

7. The method as in claim 5 further comprising:
at the user equipment: i) receiving first paging notifications in time slots of a paging channel assigned to the user equipment; and ii) retrieving second paging notifications via the executed communication management function communicating the request message.

8. The method as in claim 1 further comprising:
establishing the wireless communication link as a secured connection between the user equipment and the first wireless station.

9. The method as in claim 1, wherein the user equipment is operative to execute the communication management function during a handoff of the user equipment from the first wireless station to a second wireless station.

10. The method as in claim 9, wherein the first wireless station implements a first wireless communication protocol in a first network and the second wireless station implements a second wireless communication protocol in a second network.

11. The method as in claim 1, wherein the paging notifications support handoff of the user equipment from the first wireless station to a second wireless station.

12. A system comprising:
communication management hardware disposed in user equipment, the communication management hardware operative to:
establish a wireless communication link between the user equipment and a first wireless station, the first wireless station providing the user equipment access to a remote network;
initiate execution of a communication management function on the user equipment;
via the communication management function executed on the user equipment: communicate a request message from the user equipment over the wireless communication link to a remote entity to retrieve paging notifications associated with the user equipment; and
wherein communication of the request message includes transmission of the request message over the wireless communication link to a network address assigned to the remote entity to retrieve the paging notifications.

13. The system as in claim 12, wherein the communication management hardware is further operative to:
monitor a quality of the wireless communication link; and
initiate execution of the communication management function based on the quality of the wireless communication link.

14. The system as in claim 12, wherein the communication management hardware is further operative to:
initiate execution of the communication management function in response to detecting that a quality of communicating over the wireless communication link falls below a threshold level.

15. The system as in claim 12, wherein the communication management hardware is further operative to:
initiate execution of the communication management function in response to detecting mobility of the user equipment.

16. The method as in claim 12, wherein the paging notifications are paging notifications directed to the user equipment.

17. The system as in claim 16, wherein the communication management hardware is further operative to:
receive multiple instances of the paging notifications, the multiple instances of the paging notifications received over different network communication layers.

18. The system as in claim 16, wherein the communication management hardware is further operative to:
i) receive a first portion of the paging notifications in time slots of a paging channel assigned to the user equipment; and ii) retrieve a second portion of the paging notifications via the executed communication management function.

19. The system as in claim 12, wherein the communication management hardware is further operative to:
establish the wireless communication link as a secured connection between the user equipment and the first wireless station.

20. The system as in claim 12, wherein the communication management hardware is further operative to: execute the communication management function during a handoff of the user equipment from the first wireless station to a second wireless station.

21. The system as in claim 20, wherein the first wireless station implements a first wireless communication protocol in a first network and the second wireless station implements a second wireless communication protocol in a second network.

22. The system as in claim 12, wherein the paging notifications support handoff of the user equipment from the first wireless station to a second wireless station.

23. Computer-readable storage hardware disposed in user equipment, the computer-readable storage hardware having instructions stored thereon, the instructions, when carried out by computer processor hardware, cause the computer processor hardware to:
establish a wireless communication link between user equipment and a first wireless station, the first wireless station providing the user equipment access to a remote network;
initiate execution of a communication management function on the user equipment;
via the executed communication management function, communicate a request message from the user equipment over the wireless communication link to a remote entity to retrieve paging notifications associated with the user equipment; and
wherein communication of the request message includes transmission of the request message over the wireless communication link to a network address assigned to the remote entity to retrieve the paging notifications.

24. The method as in claim 1 further comprising:
in response to communicating the request message to the remote entity, receiving the paging notifications at the communication management function, the paging notifications transmitted from the remote entity to the communication management function in response to the communicated request message.

25. The method as in claim 24, wherein the request message provides notification to the remote entity that the user equipment supports retrieval of the paging notifications, the remote entity managing wireless services provided by the first wireless station to the user equipment via the wireless communication link.

26. The method as in claim 1, wherein the user equipment is operative to execute the communication management function during a handoff of the user equipment from the first wireless station to a second wireless station.

27. The method as in claim 26, wherein the paging notifications retrieved from the remote entity via the communication management function are generated by a first wireless network in which the first wireless station resides.

28. The method as in claim 26, wherein the paging notifications retrieved from the remote entity via the communication management function are generated by a second wireless network in which the second wireless station resides.

29. The method as in claim 1, wherein the remote entity is operative to manage handoff of the user equipment from the first wireless station to a second wireless station.

30. The method as in claim 1, wherein the remote entity is a paging notification server; and
   wherein the request message includes post information communicated to the paging notification server, the post information supporting communication of the paging notifications from the remote entity to the user equipment.

31. The method as in claim 1, wherein the network address assigned to the remote entity is a first network address; wherein the request message includes a second network address, the second network address assigned to the user equipment; and
   wherein the remote entity is operative to: i) map the second network address of the user equipment in the request message to the paging notifications, and ii) forward the paging notifications to the user equipment.

32. The method as in claim 1 further comprising:
   based on a handoff of the user equipment from the first wireless station to a second wireless station, receiving a notification notifying the user equipment to monitor paging occasions of a paging channel associated with a wireless network in which the second wireless station resides.

33. The method as in claim 32, wherein the user equipment implements a first wireless communication protocol to communicate with the first wireless station; and
   wherein the user equipment implements a second wireless communication protocol to communicate with the second wireless station.

* * * * *